Patented Sept. 5, 1933

1,925,584

UNITED STATES PATENT OFFICE 1,925,584

PRODUCTION OF PULPS CONTAINING THERMOPLASTIC SUBSTANCES

Harry C. Fisher, Cincinnati, Ohio, assignor to The Richardson Company, Lockland, Ohio, a corporation of Ohio No Drawing. Application June 25, 1932
Serial No. 619,355

17 Claims. (Cl. 92—21)

My invention finds its primary usefulness in the production, for example, of pulps of fibrous material suitable for felting or forming, upon a screen or otherwise, into useful articles, which pulps contain bitumens or other heat-plastic binder substances, e. g., resins, artificial or natural. In one aspect my invention is an intermediate process and finds application in connection with other processes for securing such pulps; in another aspect it is a process facilitating the distribution or dispersion of bitumens or like substances in a liquid medium, particularly a liquid medium containing other desired materials.

An object of my invention is the provision of means whereby a thermoplastic substance may be readily comminuted and dispersed, and may be utilized in or combined with, pulps in a paper making process.

This and other objects of my invention which will be pointed out hereinafter, or will be apparent to one skilled in the art upon reading these specifications, I accomplish by that certain procedure of which I shall now describe preferred embodiments, it being understood that modifications may be made in my invention without departing from the spirit of it.

Broadly in the practice of my invention, I combine a bituminous or other thermoplastic substance, for example, but without limitation, resins, natural or artificial, with a mineral or other substance preferably of absorbent character, and finely divided, so that the absorbent substance is caused to absorb a great portion, but not all, of the thermoplastic substance. The material may be organic or inorganic. Finely divided, woody or cellulosic materials may be employed as exemplary of the organic class; but for most purposes I prefer to employ inorganic or mineral materials, and it is in connection with these that I shall describe my exemplary embodiments, it being understood that my invention is not limited thereto.

Mineral substances which I have found preferable are generally of the class of the diatomaceous earths which exist in or which may be crushed to small particles which, in some varieties, are themselves more or less cellular and porous. In my process as exemplary of the diatomaceous earth class of fillers, I may use kieselguhr, fuller's earth and the like, but I prefer to employ a silicious diatomáceous earth known commercially as "Celite" or "Dicalite", and the calcined product is a convenient grade to use. This substance is obtainable commercially in the form of a fine whitish powder, which after calcining, takes on a reddish cast due to traces of iron present. I have found that I can so combine a thermoplastic substance with celite, as an example of the materials which I may employ, as to cause the celite to absorb the thermoplastic material substantially within the body of the individual particles or aggregates thereof, and I obtain masses which, in accordance with the amount and the hardness or softness of the thermoplastic substance used, and in the particular method of association used, vary in consistency from doughy, pasty, cheesy, or friable masses to loose powders. Hereinafter I shall refer to bitumen as the thermoplastic substance employed, but it will be understood that I desire to include, and that my process is applicable to other thermoplastic substances including the tars and pitches, waxes, resins, shellac, condensation products, etc. Of course, any finely divided matter that will properly absorb the thermoplastic substance can be used; and among the mineral matters I have successfully employed clay, talc, slate dust, etc., but the more absorbent the material the better.

I preferably combine the bitumen used with just enough mineral matter to properly absorb it and be agglomerated therewith, and to properly distribute it throughout the fibrous material. I mix the bitumen with the mineral matter in any suitable mixing or combining apparatus, of which there are many. My invention is not restricted to any particular mixer or combining machine; but I have used with success a mixer of the ordinary Werner-Pfleiderer type. I may introduce into this mixer a quantity of the bitumen in a non-solid condition and add to it a quantity of the mineral matter in its air-dry condition. Heat will serve to maintain the bitumen in the non-solid condition. At the completion of the mix I may add a quantity of water, or as an alternative procedure, I may add my mineral matter wet and mix the bitumen with it in this condition, maintaining the water content by subsequent additions if the heat of the mixer tends to drive it off in the form of steam. The necessity of adding the mineral matter to the bitumen in a wet state depends somewhat upon conditions, such as the amount and nature of the bitumen. Where the amount of bitumen is large compared to the mineral matter, it is advisable and sometimes necessary to pre-wet the mineral matter; where the amount of bitumen is small in relation to the mineral matter pre-wetting is many times unnecessary. The ratio of bitumen to mineral matter is dictated further by the requirements of the finished bitumen-containing sheet; where it is imperative to keep the mineral matter at a minimum, pre-wetting is advantageous. In many instances where the amount of mineral matter is sufficient completely to absorb the bitumen and produce a loose powdery or granular mass, the use of water at any stage of the mixing process is not necessary.

To use a bitumen-mineral matter combination produced by my process, it is added to partially or completely refined paper pulp in a paper mill beater or similar machine. The paper pulp can comprise organic fibers such as groundwood, sulphite, kraft, rag, etc., or mineral fibers such as asbestos.

I will now cite examples to illustrate the use of my process. The first illustrates the use of substantially hard bitumen. Two other examples illustrate the use of a soft bitumen, with, in one case, enough diatomaceous earth substantially to absorb all of the bitumen and produce a powdery mass, and, in the other case, a smaller amount of diatomaceous earth with the consequent production in the initial mixing stages of a black, solid, doughy mass.

A soft binder is one which cannot be comminuted by ordinary means, such as crushing, especially in the absence of water. A hard, or substantially hard binder is one which can be comminuted with some degree of ease by crushing, especially in the absence of water. Expressed in terms of the standard needle penetration test at 77° with 100 grams applied for 5 seconds, binders testing from substantially 10–15 up (examples: 25, 50, 100) are soft; those testing from substantially 10–15 down are hard, or substantially hard.

In the first example, there was used 600 parts of a substantially hard asphalt, further described below, and 300 parts of air-dry calcined celite moistened before mixing with 300 parts of water. The asphalt tested ball and ring softening point of 190 degrees F., penetration 77 degrees F. 100 grams 5 seconds of 1, 115 degrees F. 50 grams 5 seconds of 3, and 32 degrees F. 200 grams 60 seconds of 1. The asphalt was brought to a thick molten condition at 240 degrees F. by the application of heat to the W. P. mixer. Next the pre-wet celite was added to it while the mixer blades were in motion and after several minutes mixing there was produced at 205 degrees F. a stiff, short, doughy, black mass. At 70–80° F., the doughy mass became a hard, solid, friable black mass characterized by a rather smooth, clean, matt-surfaced fracture. It could be crushed easily and in both lump and crushed form was easily wet by water. Typical lumps of material from the mixer contained 14.1 and 8.8 percent water.

Instead of mixing a bitumen and celite to a dry or substantially dry condition, it is advantageous to incorporate water into the completed mix. The amount to be added is not critical, being merely enough to be absorbed into the doughy mass of hot compound without producing any excess of free water. Such an excess of water is undesirable since diatomaceous earth may be worked out of the compound by it to remain in the water. In a hot condition, say around 200 degrees F., the pre-wet compound is very soft and plastic, and pressure of the fingers expresses water from it; the hot compound in the mixer is kneaded in substantially one large continuous mass. At room temperature the compound is hard but friable; easily crushed to a powder, is somewhat porous, has a matt-surface and tends toward a hackly fracture.

This mass containing 900 parts of asphalt plus celite then was added to a partially beaten fibrous mixture, in a paper mill beater, comprising 150 parts each of unbleached sulphite pulp and waste news print. When extra water was not incorporated in the mixer, the friable mass was added to the beater in lumps small enough to be drawn under the roll easily. The temperature of the beater contents varied between 80 and 90 degrees F. and as the refining of the fibrous material proceeded simultaneously the friable mass was comminuted into smaller and smaller particles which were held in suspension in the pulp but without any substantially adherent relation thereto. Of course, if desired, the friable mass can be comminuted by any suitable method before it is added to the paper mill beater.

Sheets of this pulp formed on a paper making instrumentality and dried in the air had a gray appearance due to the dispersion in the fibrous mass of finely divided particles of asphalt and celite. There is a slight tendency for the sheets to be two-sided. Upon drying the sheets in an oven and continuing the heating, the tiny asphalt particles melted and coalesced together giving a stiff, substantially uniformly black sheet in which a part at least of the asphalt was reabsorbed into the celite. The sheet was brownish-black throughout, deep black on both surfaces; but apparently the bitumen did not fully coat the fibers. By increasing the ratio of asphalt to diatomaceous earth as much as possible and then increasing the ratio of their combined weights to that of the fibers, the proportion of bitumen to fibers could be increased tending toward a greater coverage of the individual fibers.

In the example now to be described, there was used a soft asphalt with ball and ring softening point of 162 degrees F., penetration 77 degrees F. 100 grams 5 seconds of 15, 115 degrees F. 50 grams 5 seconds of 56, and 32 degrees F. 200 grams 60 seconds of 7. 200 parts of asphalt and 300 parts of air-dry calcined celite were used. The asphalt was brought to a thickly molten condition at 195 degrees F. and the celite mixed in with the continued addition of heat until, after several minutes mixing, there was produced a brownish-black powdery mass at a final temperature of 345° F. After cooling to substantially room temperature, the 500 parts of powder thus produced were added to a partially refined charge of 150 parts each of unbleached sulphite fiber and waste news print in a paper beater. The water in the beater varied from 80 to 90 degrees F. temperature, and the black powder mixed into the pulp very easily, giving, after several minutes, a thoroughly black pulp containing the bitumen in a very finely divided condition with but little permanent adhesive relationship to the fibers. However, there was distinctly more adhesive relationship in this case than where merely powdered hard asphalt of similar degrees of fineness is added to paper pulp. A portion of the bitumen was disintegrated from the celite, but the pulp as a whole had a very velvety fine grained feel and appeared totally black. An air-dry sheet made from the pulp had a uniform grayish appearance. Oven dried sheets were noticeably darker in color but were not black.

In the next example the 15 penetration asphalt was mixed with insufficient diatomaceous earth to totally absorb it, with the resultant production of a doughy mass in the initial stage of the mixing. Specifically, there was used 600 parts of the 15 penetration asphalt described above and 300 parts of air-dry calcined celite, the latter being pre-wet with 300 parts of water before using it. The asphalt was brought to a temperature of 235 degrees F. where it was thickly molten and the pre-wet celite mixed in using a W. P. mixer with the continuous application of heat to give after several minutes a short, tough, doughy, black mass at 170° F., whereupon water was added with the application of more heat, and mixing converted the mass into a soft, granular paste at 170° F. The granular paste in the mixer was covered with a supernatant liquor of celite and water. When this paste was added to 150 parts each of unbleached sulphite pulp and waste news print fibers in the paper mill beater, and the temperature of the beater with its fibrous and bituminous content was kept at around 80 to 90 degrees F., there was produced a mixture of fibers through which was interspersed aggregates of celite and asphalt in flakes and pieces, of dimensions varying from minute to 1/16 inch and without any adhering contact with the fibers. During the beating process there was a noticeable tendency for the celite-asphalt aggregates to break down, the asphalt of which, together with a certain proportion of celite, tended to collect under the beater roll. By passing this pulp through refiners such as a Jordan the size of suspended bituminous aggregates can be diminished.

When pulp from the beater was formed into a sheet and dried in the air the asphalt appeared in the form of specks and pieces varying in size from microscopic to 1/16 inch and uniformly distributed throughout the fibrous matter. Portions of the celite were intermixed with the fibrous matter in the same way that any filler is intermixed; other portions of it were distributed with the bitumen. After oven drying there was produced a speckled sheet with the bitumen in spots varying from microscopic to ½ inch, in dimensions; there was not produced, however, a totally black sheet. By further refining, that is, mechanically comminuting the bituminous aggregates in the beater or in the Jordan, or in a rod mill, or in any device suited to the comminuting of the diatomaceous earth-binder aggregates (in the presence of the fibers or not), the size of bituminous aggregates is made smaller, whereupon oven dried sheets assume a more and more uniformly speckled or even solid black appearance.

It will be clear that other absorbent mineral materials or absorbent and porous vegetable or animal materials will act similarly to celite in the examples given above.

I am not certain of the exact nature of the combination of absorbent matter and bitumen, or other thermoplastic substances, but believe that the latter either are absorbed into or into and onto the particles of finely divided matter or are absorbed onto the particles alone. The finely divided mineral or other matter does not form any kind of protective coating around the particles of bitumen or other thermoplastic material. I refer, of course, to the mixture of bitumen and absorbent matter as produced in the mixing device. Again, I prefer to limit the amount of absorbent matter to that which will substantially serve to disperse the bitumen throughout the paper pulp in finely divided form. I have obtained in this way a bituminous mass which, although it may contain a bituminous substance of very appreciable softness at normal temperatures, nevertheless is susceptible to ready and fine comminution when subjected to the instrumentalities ordinarily used to reduce fibrous matter in water to a pulp, and to refine the pulp. I have thus satisfactorily effected the comminution and dispersion of bituminous materials to a general degree of fineness and homogeneity, which, so far as I know, has not hitherto been attained.

Furthermore, I have achieved a substance containing bitumen or other thermoplastic material, which does not need to be pre-ground before addition to a pulp although such pregrinding is advantageous and in many instances produces a superior product. However, I prefer to add it to a beating engine in lumps or other aggregates which are not too large to be pulled easily under the beater blades.

It is to be understood, however, that the masses of asphalt, absorbed in a sufficient amount of finely divided absorbent matter, especially when mixed with the proper additions of water, display a certain degree of avidity for water so that the mere agitation of them in an excess of water tends to break up the mass into smaller parts, which in turn break up, due to the absorption of more water or the action of the beater blades, or other refiners.

Regarded as a step in the formation of a pulp containing a binder substance my process is useful in a number of different ways. It may be utilized as a means for securing a satisfactory comminution and distribution of a bituminous substance in a body of pulp to the end desired. Where the bitumen mineral matter combination alone is added to a pulp of clear fibers, not only am I enabled by my process to get into the pulp and resultant felted sheet a considerable quantity of bituminous material, but I have found that the presence of absorptive matter tends to increase the openness and porosity of the sheet facilitating subsequent saturation where desired. This may be effected by passing the formed and dried sheet through a bath of binder substance which may or may not be the same as the bituminous substance contained in my bitumen mineral matter combination.

Pulps already containing bitumen or other thermoplastic substances can have additions made thereto by my process.

I have discovered that when my bitumen-absorptive matter combination is beaten, the bitumen and mineral matter tend in a degree to separate, dependent upon the amount of beating, temperature of the water, etc. I prefer not to beat to the extent of effecting too great a separation. In most of the above I have voiced a preference for diatomaceous earth or similar absorbent mineral matter. However, in these specifications and in the claims that follow, I do not wish to be limited by any particular degree of absorptivity in my organic or inorganic filler material. It will be understood that the relative amount of filler to binder may be varied to compensate, to some extent at least, for differences in absorptivity. As to binders, I may employ either soft or hard substances; as to fillers either organic or inorganic substances having some degree of absorptivity. The completed mixtures of binder and filler will vary from a condition in which the binder is substantially wholly absorbed by means of filler particles, giving a product which is an agglomerate in a granular consistency, through various stages of less complete absorption to substantially a continuous or solid mass, which, however, is readily friable. My invention relates to the mixing of fillers with binders in nonsolid form with or without wetting (but in any event without the use of such amounts of water as will serve as a circulating medium, and without the production of a dispersion of coated binder particles) to a condition of easy comminution or dispersability by mechanical agencies at ordinary temperatures.

In still another example, 300 parts of the 15 penetration asphalt described above was brought to a liquid condition at a temperature of 390° F. in a mixer of the Werner & Pfleiderer type. 700 parts of non-colloidal clay, in its air-dried, powdered condition, was added to the asphalt in the mixer where it produced a black, loose, sandy mass at a temperature of 326° F. This black, sandy mass then was added to a partially beaten charge of 150 parts each of kraft papers and chip paper in a paper mill beater. The mixture then was beaten for 45 minutes producing a black pulp containing suspended therein particles of associated bitumen and clay. Sheets of paper formed from the pulp and dried in an oven were speckled black uniformly throughout.

In a similar manner, 1300 parts of green slate dust, in its air-dry condition, was mixed into 300 parts of the 15 penetration asphalt described above, at a temperature of 395°F., where it was a very thin liquid. This produced a black, loose, sandy mass at 300° F. This black, sandy mass was charged into a partially refined pulp in a paper mill beater, comprising 70 parts each of news and chip fibers, 100 parts unbleached sulphite and 50 parts Chrysotile asbestos. Oven dried sheets from this pulp were speckled throughout with asphalt.

Having thus described my invention, what I claim as new and desire to secure by Letters Patent, is:—

1. A process of producing a dispersion of thermoplastic binder substance which comprises mixing with said binder a quantity of absorbent, finely divided non-fibrous matter under conditions to cause said binder to be absorbed by said matter and form therewith a friable composition, and afterward dispersing in water the composition so formed.

2. A composition of binder and filler in which the filler is a finely divided, absorbent, non-fibrous material, and in which the binder is a normally hard plastic permeating the voids of the material and covering the surfaces of the material to the extent of forming with the material an agglomerate composition which is friable and adapted for dispersion of the binder in a pulp and water composition, for the purposes set forth.

3. A composition of bitumen and diatomaceous earth, in which the bitumen is absorbed into the body of the diatomaceous earth and is present in an amount sufficient to substantially fill the voids in the diatomaceous earth, but not substantially greater than sufficient to agglomerate said mass of diatomaceous earth.

4. A process of making a pulp which comprises mixing a plastic binder material with an absorbent, finely divided non-fibrous material having internal voids in the particles thereof, the amount of binder being sufficient substantially to fill the voids but substantially not greater than sufficient to agglomerate the material, producing a pulp of fibrous material, and during the beating of said pulp adding to the same so as to be dispersed therethrough, the said composition of binder and absorbent material.

5. A process of producing a dispersion which comprises mixing a binder with a mineral material having porous particles, said mineral material being wetted, to the extent of causing said binder substantially to be absorbed by said particles, the excess amount of binder being not greater than sufficient to agglomerate said material, and adding the mass so formed to a pulp of fibrous material during the formation thereof.

6. A process of producing a bituminous dispersion which comprises mixing a soft bituminous substance with a finely divided diatomaceous earth, said substance being present in amount sufficient to substantially fill the voids in the diatomaceous earth, but not greater substantially than to agglomerate said diatomaceous earth, adding said composition to a pulp and distributing said agglomerated composition in small, uncoated particles throughout said pulp by agitation.

7. A process of producing a pulp containing a binder which comprises mixing a plastic binder substance with a quantity of finely divided absorbent non-fibrous substance having voids in its particles to the extent of causing said substance to be absorbed in said voids and to agglomerate said substance, adding the agglomerated composition so formed to a pulp already containing a binder substance of different characteristics and dispersing it therethrough by agitation, whereby a composite pulp is formed containing binder substances of different characteristics which are capable of fluxing together on the driers of a paper machine to form a composite binder substance.

8. A process of producing a pulp which comprises mixing a binder substance with a diatomaceous earth to the extent of causing said binder substance to become substantially absorbed within the internal voids of the particles of said diatomaceous earth and to agglomerate the diatomaceous earth, adding the agglomerated composition thus formed to a suspension of fibrous material in water and beating the said composition in the presence of said fibrous material.

9. A process of producing a pulp which comprises mixing a bituminous substance with a diatomaceous earth to the extent of causing said bituminous substance to become substantially entirely absorbed within the internal voids of the particles of said diatomaceous earth and to agglomerate the diatomaceous earth, adding the agglomerated composition thus formed to a suspension of fibrous material in water and beating the said composition in the presence of the said fibrous material to the extent of causing some of said bitumen to come away from its agglomeration with said diatomaceous earth.

10. A process of producing a pulp containing a binder substance which comprises mixing a hard binder substance with a wet diatomaceous earth when said binder is in a non-solid condition, said diatomaceous earth being insufficient in amount completely to absorb said binder, to the extent of producing a friable composition, and dispersing the product so formed in water containing feltable fibers.

11. A process of producing a pulp containing a binder substance which comprises mixing a hard binder substance when in non-solid condition with a wet diatomaceous earth, said diatomaceous earth being insufficient in amount completely to absorb said binder but the excess of binder being no more, substantially, than to agglomerate said diatomaceous earth, said mixing being continued to the extent of producing a friable composition containing some water, and dispersing the product so formed in water containing feltable fibers.

12. A process of producing a pulp containing a hard binder substance which comprises mixing the binder substance when in non-solid condition with a wet diatomaceous earth, said diatomaceous earth being insufficient in amount completely to absorb said binder but the excess of binder being no more, substantially, than to agglomerate said diatomaceous earth, said mixing being continued with water additions, to the extent of producing a friable composition containing some water, and dispersing the product so formed in water containing feltable fibers.

13. A process of producing a pulp containing a binder substance, which comprises mixing a hard binder in non-solid condition with sufficient diatomaceous earth substantially completely to absorb said binder but the excess of binder being no more, substantially, than to agglomerate said diatomaceous earth, to the extent of producing a granular aggregate, and dispersing the product so formed in water containing feltable fibers.

14. A process of producing a pulp containing a hard binder substance, which comprises mixing the binder while softened with a diatomaceous earth less in amount than necessary completely to absorb said binder but the excess of binder being no more, substantially, than to agglomerate said diatomaceous earth, said mixing being continued to the extent of producing a short, doughy mass, and dispersing the mass so formed in a pulp of fibers in water suspension.

15. A process of producing a pulp containing a binder substance, which comprises mixing a heat plastic binder with an absorbent, finely-divided inorganic matter to the extent of producing a friable mass, disintegrating said mass, and dispersing the disintegrated mass in a pulp of fibers in water suspension.

16. A process of producing a pulp containing an asphalt substance which comprises mixing an asphalt with a wet diatomaceous earth when said asphalt is in a non-solid condition, said diatomaceous earth being insufficient in amount completely to absorb said asphalt, but the excess of asphalt being no more, substantially, than to agglomerate said diatomaceous earth, producing a friable mass, and dispersing the product so formed in water containing feltable fibers.

17. A process of producing a pulp containing an asphalt substance, which comprises mixing a soft asphalt in non-solid condition with sufficient diatomaceous earth substantially completely to absorb said asphalt, but the excess of asphalt being no more, substantially, than to agglomerate said diatomaceous earth to the extent of producing a granular agglomerate, and dispersing the product so formed in water containing feltable fibers.

HARRY C. FISHER.